UNITED STATES PATENT OFFICE.

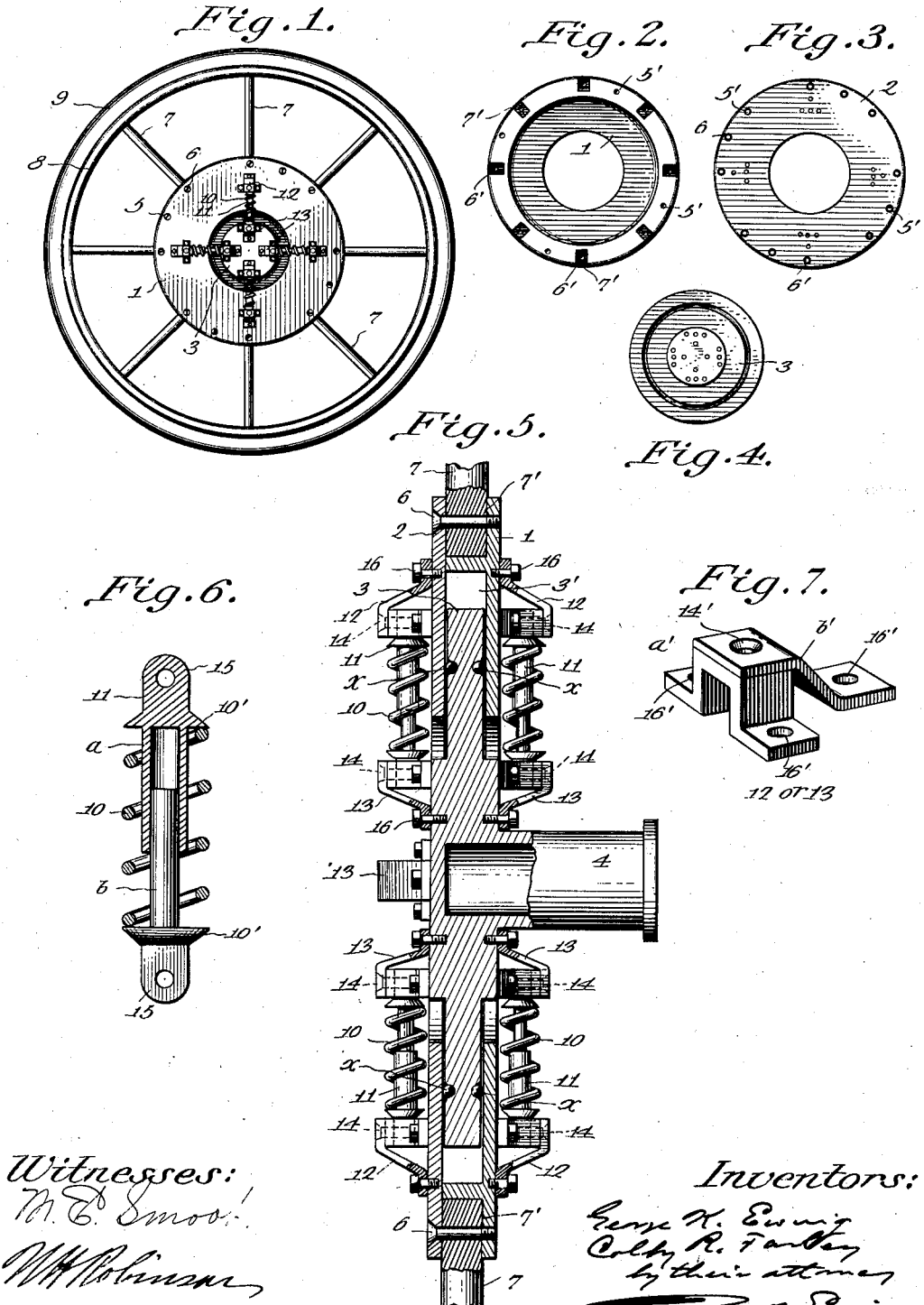

GEORGE K. EWING AND COLBY R. FARLEY, OF EWINGTON, OHIO.

SPRING-HUB WHEEL FOR AUTOMOBILES.

1,055,026.  Specification of Letters Patent.  Patented Mar. 4, 1913.

Application filed June 26, 1912. Serial No. 705,994.

*To all whom it may concern:*

Be it known that we, GEORGE K. EWING and COLBY R. FARLEY, citizens of the United States of America, and residents of Ewington, Gallia county, in the State of Ohio, have jointly invented a new and useful Improvement in Spring-Hub Wheels for Automobiles, of which the following is a specification.

This invention relates to substitutes for road wheels having inflated tires, and consists in certain novel combinations of parts and an improved spring-hub wheel embodying said combinations or any of them, as hereinafter particularly described and claimed.

The leading object of this invention is to so construct and arrange the accessories of a complement of external metallic springs as to provide for repairing or replacing any one of the springs, or its accessories in whole or in part without disturbing any of the other springs, and with the least possible delay and expense.

Other objects will be set forth in the general description which follows.

A sheet of drawings accompanies this specification as part thereof.

Figure 1 is a side view of the improved wheel; Figs. 2 and 3 are respectively face views of its two side disks detached; Fig. 4 is a face view of its center disk; Fig. 5 represents an axial section through the hub on a larger scale; Fig. 6 is a sectional view of one of the springs, with its telescopic thrust-rod, detached; and Fig. 7 is a perspective view of one of the spring brackets, detached.

Like reference characters refer to like parts in all the figures.

The hub of the improved wheel comprises a pair of annular side disks 1 and 2 (Figs. 2 and 3) and a center disk 3 (Fig. 4), the latter integral with or rigidly attached to the axle-engaging portion 4, Fig. 5; which latter may be of any suitable known or improved construction. The side disks 1 and 2 are united by two sets of screws or bolts, 5 and 6, to form a hollow annular flange portion of the hub which is rigidly united by radial spokes 7 with a concentric rim 8; this being in turn surrounded by a tire 9, which may also be of any suitable known or improved construction and of either a rubber or a metal type. The disks 1 and 2 are provided with bolt holes for the bolts 5 and 6 as shown at 5' and 6' in Figs. 2 and 3; and spoke sockets 7' coincident with the bolt-holes 6' are formed in an offset portion of the disk 1, the spokes 7 being made fast at their inner ends by said bolts 6. By removing the disk 2 the spoke sockets 7' are so opened as to facilitate repairing or replacing a broken or bent spoke. The spoke-fastening bolts 6 assist the bolts 5 in resisting lateral or skidding strains. The center disk 3 is of less diameter than the space 3', Fig. 5, between the side disks 1 and 2, so as to have sufficient play edgewise in said space; and a sufficient number of helical compression springs, 10, are interposed between collars, 10', on telescopic rods, 11, one of which is shown in section in Fig. 6, the ends of these rods being pivoted to radially opposed brackets 12 and 13 by suitable pivotal bolts 14. The sides of the center disk 3, otherwise exposed to rubbing contact with the side disks 1 and 2, may be provided with anti-friction balls, *x*, Fig. 5, or otherwise rendered sufficiently frictionless. The springs 10 may be coiled from rods of any suitable resilient metal or alloy.

Each of the telescopic rods 11 is composed of two members, *a* and *b*, Fig. 6, respectively tubular and solid, and each provided beyond its collar 10' with a head 15 having a screw-tapped hole to receive the threaded end of the corresponding pivotal bolt 14. Each of the brackets 12 and 13 is also preferably composed of two members, *a'* and *b'*, Fig. 7, constructed to form a rigid bracket of sufficient strength adapted to be readily forged from flat bar metal by short transverse cuts and bends and provided with holes 14', Fig. 7, in both of said members *a'* and *b'* to receive one of said pivotal bolts 14, and holes 16' Fig. 7 to receive attaching screws or bolts 16.

In operation the springs 10 beneath the plane of the axle carry the load with the required resiliency, the strain being transmitted to them through the center disk 3 of each hub, the brackets 13 bolted thereto, and the inner members (*b* Fig. 6) of the corresponding telescopic rods 11, with their described connections; and transmitted therefrom through the outer members (*a* Fig. 6) of the same telescopic rods 11, the pivotal bolts 14 and brackets 12 interacting therewith, the side disks 1 and 2, spokes 7, rim 8 and tire 9, with the connections of these parts of the improved wheel. Compare Fig. 5 and Fig. 1. The pivotal connections 14— provide for transmitting the torsional strain from the driven axle to the outer parts of the wheel in the most effective manner; the several springs with their rods turning simultaneously on these pivots to the required extent. The location of the pivotal axes equally close to both ends of each spring assists to prevent the distortion of the springs or any of their accessories by torsional strains within the wheel.

By removing the bolts 16 at one or each end of a spring, that spring with its accessories may be detached, so as to be readily replaced, in whole or in part, by way of repair, without disturbing any of the other springs, and with the least possible delay and expense.

Four sets of the springs 10 and their appurtenances for each side of the wheel are shown, each of the same being arranged in what may be termed a radial line of resiliency. It will be obvious that the number on each side may be three or more, and increased to any required extent; and other like modifications will suggest themselves to those skilled in the art.

Having thus described said improvement, we claim as our invention, and desire to patent under this specification:

1. The combination, in a spring-hub wheel, of a center disk having a suitable axle-engaging portion, a hollow annular-flange portion within which said center disk has sufficient edgewise play, spokes fast at their inner ends in said annular-flange portion, a rim carried by said spokes, a tire surrounding said rim, a sufficient number of external radially arranged helical springs, a bracket at the outer end of each spring detachably affixed to said annular-flange portion, an opposing bracket for each spring detachably affixed to said center disk, and spring-engaging means connecting said brackets, including a pivotal bolt parallel with the axis of the wheel at each end of each spring, and a telescopic rod within each spring having both ends constructed to interact with said pivotal bolts.

2. The combination, in a spring-hub wheel, of a center disk having a suitable axle-engaging portion, a hollow annular flange portion within which said center disk has sufficient edgewise play, spokes fast at their inner ends in said annular flange portion, a rim carried by said spokes, a tire surrounding said rim, a sufficient number of externally arranged helical springs, a bracket at the outer end of each spring detachably affixed to said annular-flange portion, an opposing bracket for each spring detachably affixed to said center disk, and spring-engaging means connecting said brackets including a pivotal bolt parallel with the axis of the wheel at each end of each spring, and a telescopic rod within each spring having both ends constructed to interact with said pivotal bolts, each of said detachable brackets being composed of two bar-metal members and provided with holes in both of said members to receive one of said pivotal bolts.

GEORGE K. EWING.
COLBY R. FARLEY.

Witnesses:
M. AGNES SOLES,
E. V. SOLES.